United States Patent [19] [11] 4,141,837
Heckmann et al. [45] Feb. 27, 1979

[54] OSCILLATING CENTRIFUGE FOR THE DEHYDRATION OF FINE GRAINED MATERIAL

[75] Inventors: Wolfgang Heckmann; Wilhelm Reulecke, both of Bergisch Gladbach, Fed. Rep. of Germany

[73] Assignee: Klöckner-Humboldt Deutz AG, Fed. Rep. of Germany

[21] Appl. No.: 845,927

[22] Filed: Oct. 27, 1977

[30] Foreign Application Priority Data

Nov. 9, 1976 [DE] Fed. Rep. of Germany ....... 2651099

[51] Int. Cl.2 ............................................ B01D 21/26
[52] U.S. Cl. ..................................... 210/365; 210/377
[58] Field of Search ................ 210/364, 365, 367, 377

[56] References Cited

U.S. PATENT DOCUMENTS

| | | | |
|---|---|---|---|
| 2,370,353 | 2/1945 | Howe | 210/377 |
| 2,886,179 | 5/1959 | Heckmann | 210/370 |
| 3,123,557 | 3/1964 | McPhee et al. | 210/377 |
| 3,205,095 | 9/1965 | Dietzel et al. | 210/377 |

FOREIGN PATENT DOCUMENTS

| | | | |
|---|---|---|---|
| 549066 | 11/1957 | Canada | 210/367 |

*Primary Examiner*—William A. Cuchlinski, Jr.
*Assistant Examiner*—Jon E. Hokanson
*Attorney, Agent, or Firm*—Hill, Gross, Simpson, Van Santen, Steadman, Chiara & Simpson

[57] ABSTRACT

A centrifuge for the dewatering of a fine grained material having a downwardly flaring frusto conically shaped porous sieve cage rotatable about its axis and axially oscillatible with a preacceleration frusto conically shaped cone within the sieve cage with its larger end upwardly and a central material delivery means for supplying material to the cone and an annular spoked mounting means extending between the base of the cone and sieve cage with a drive connecting to the mounting means and an elastic connection between the rotatable drive and sieve cage and an elastic connection between the oscillatible drive and sieve cage and an annular downwardly extending solid collection housing mounted at the lower end of the sieve cage and an annular housing surrounding the sieve cage for the collection of water with the oscillatible drive and rotatable drive mounted at the base of the unit coaxial with each other.

9 Claims, 2 Drawing Figures

OSCILLATING CENTRIFUGE FOR THE DEHYDRATION OF FINE GRAINED MATERIAL

BACKGROUND OF THE INVENTION

Figures 1, 2:
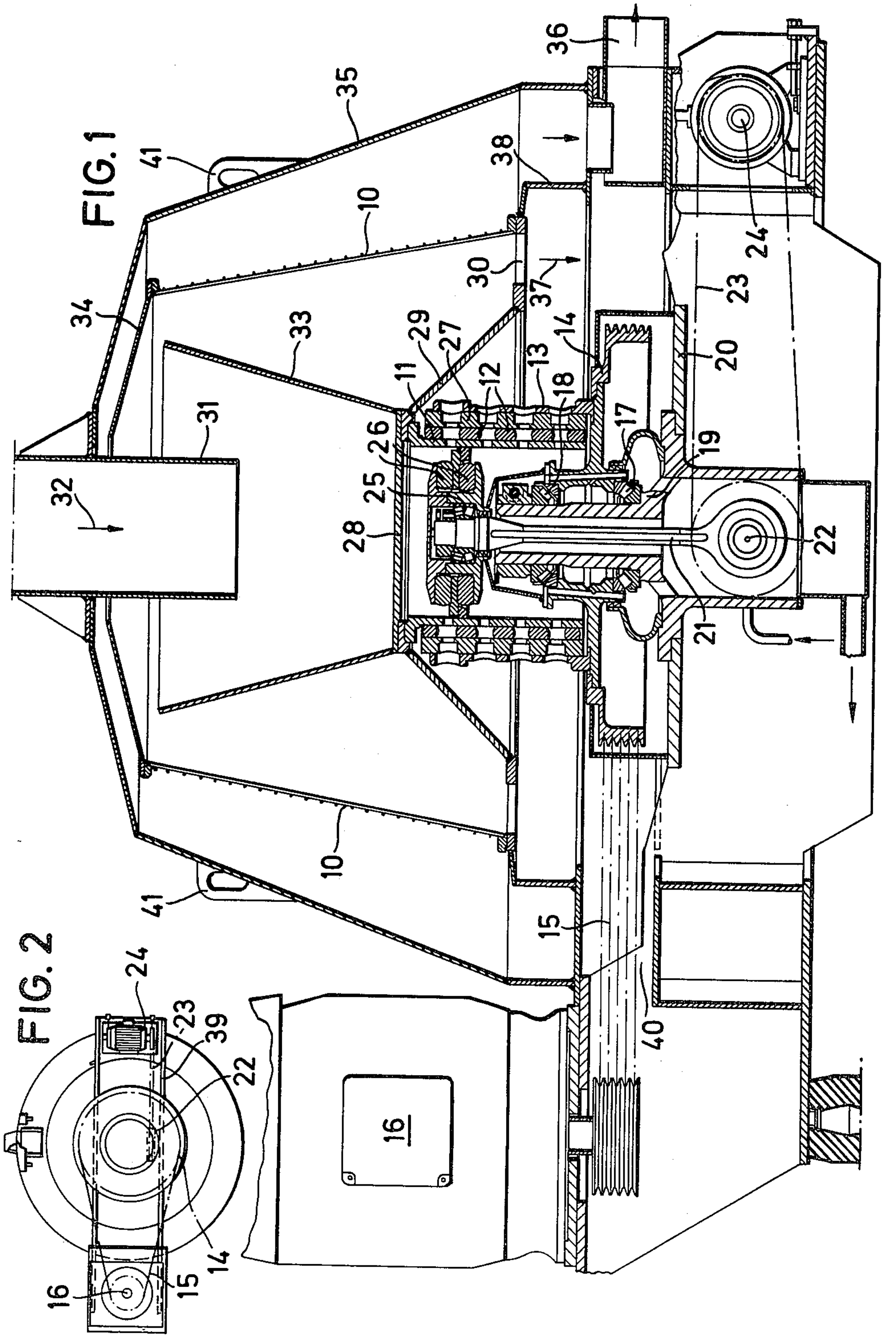

The invention relates to improvements in mechanisms for separating water from fine granular material such as are known as oscillating centrifuges, and more particularly to an oscillating centrifuge which has a rotating conically shaped porous sieve cage which is elastically connected with a rotary and an oscillating drive and having a stationary enclosing housing for the collection of water and a housing for the collection of dehydrated solids carried on the sieve cages.

Devices have heretofore been provided for the separating of water from granular materials such as, for example, wet bituminous coal having a granular diameter on the order of zero to 10mm, and one type of device is shown in U.S. Pat. of Heckmann No. 2,886,179. In another device providing a known oscillating centrifuge, as shown in German Pat. No. 1,060,796, the conical sieve cage which is provided rotates and carries out simultaneous rapid axial oscillations. The tapered or small diameter of the frusto conical or truncated cone shaped sieve cage lies beneath the centrifuge. The material to be dewatered is supplied centrally from above, for example, such as wet coal, and is accelerated into a cone arranged within the sieve cage which is widened downwardly and is centrifuged off from the lower rim of a preacceleration cone on the lower end of the sieve cage. From there the centrifuging material migrates during its dehydration upwardly along the sieve cage sleeve widening upwardly conically. Around the cage is a stationary nonrotating filtrate collection container or water collection container respectively. From the upper sieve cage rim, the dehydrated solid is centrifuged off and it must be centrifuged off in a radial direction out over the filtrate collection container and collected on the periphery. Thereafter in the structure of a known type of centrifuge referred to above, a further stationary housing must be located around the stationary filtrate collection container which collects the dehydrated solid centrifuged off from the sieve cage and guides it downwardly.

By virtue of the necessarily large radius of the centrifuged off dehydrated solids, the structure of the heretofore known centrifuge becomes very wide in diameter. This is very disadvantageous, and when the centrifuged off dewatered material, by means of devices arranged beneath the centrifuge, such as chutes or cones, must again be conducted from the periphery to the center in order to be continually conveyed off on a conveyor belt, the structural height of the entire centrifugal installation becomes very large. For example, in the case of coal dewatering as used in modern installations, the coal must be conveyed off over conveyor belts or chain conveyors. For this arrangement known constructions of vertically oscillating centrifuges have proved disadvantageous and have been replaced by a horizontal oscillating centrifuge which has appreciable disadvantages as contrasted with an equivalent vertical oscillating centrifuge, with one of the disadvantages being a substantially smaller output.

An important object of the invention is to construct a vertical oscillating centrifuge having a high capacity output wherein the diameter of the housing for the collection of the dewatered solids and the structural height of the entire centrifugal installation including the mechanism for withdrawal of solids, is as small as possible.

One of the aforementioned problems of oscillating centrifuges of the type heretofore known is obviated in that with the present invention, the conically shaped sieve cage is flared outwardly in a downward direction, and a solids collection housing is provided which extends downwardly at the lower end of the sieve cage where it has the largest diameter.

In the construction of an oscillating centrifuge in accordance with the present invention, the cne tip of the sieve cage lies above the centrifuge, and the dewatered solids are not centrifuged off the upper, but instead over the lower sieve cage rim. Therefore, the radius of the centrifuged off solids does not extend in a radial direction over the filtrate collection container, and it is sufficient if the diameter for the centrifuged solids as they are collected corresponds approximately to the greatest sieve cage diameter. The solids collection housing extending downwardly and being attached to the lower sieve cage end needs only have an internal diameter which is only slightly larger than the diameter of the sieve cage. A solids collection housing concentrically surrounding the filtrate collection container of the type which makes known vertical oscillating centrifuges so wide is not necessary in accordance with the principles of the present invention.

Therefore, the centrifuge construction in accordance with the present invention has a relatively small outer diameter. Also, a comparably small structural height results when the structure is provided to again convey together the centrifuged dewatered solids through chutes or cones on the lower side of the centrifuge from the periphery to the center which is necessary, for example, for charging onto a conveyor belt. Therefore, the vertical oscillating centrifuge in accordance with the present invention when compared wth an equivalent horizontal oscillating centrifuge, has an output rate of approximately 1½ times the horizontal centrifuge and is particularly well adapted for installation into modern coal dewatering installations.

In accordance with the special features of the invention, the sieve cage is not constructed with its small diameter but instead with its largest diameter connected to the rotary and oscillating drive. By means of this type of construction, the strength of the sieve cage itself is increased, and this construction insures higher axial accelerations of the sieve cage.

An overall objective of the invention is to provide an improved rotating oscillating centrifuge for dewatering material wherein the construction accommodates balancing of drive forces in such a manner that forces are at a minimum so that the overall strength of the construction may be maintained at a minimum and thus decreasing the overall size and the cost of construction and operation of the unit.

Other objects, advantages and features will become more apparent, as will equivalent constructions which are intended to be covered herein from the teaching of the principles of the invention in connection with the disclosure of the preferred embodiment in the specification, claims and drawings, in which:

DRAWINGS

FIG. 1 is a vertical sectional view taken through the axis of an oscillating centrifuge constructed and operating in accordance with the principles of the present invention; and FIG. 2 is a reduced size plan view, shown somewhat schematically to illustrate the drive arrangements of the mechanism.

DESCRIPTION

As illustrated in FIG. 1, a vertical operating centrifuge has a frusto conical shaped sieve cage 10, which is shaped as a frustrum of a cone and may be referred to as frusto conically shaped, where the tapered tip or smaller diameter extends upwardly above the centrifuge. The sieve cage is supported and driven on a carrier body 11 which is a hollow cylindrically shaped member and on the periphery of the body 11, are positioned a plurality of thrust springs 12 which preferably are of rubber and are radially pretensioned in installed position, and the thrust springs provide an elastic connection with a drive sleeve 13 which concentrically surrounds the springs. The drive sleeve 13 is secured to a rotary drive having a V-belt pulley 14 which is driven by V-belts 15 in turn driven by V-pulleys on a motor 16. The belt pulleys 14 are rotatably supported by bearings 17 and 18 on a hollow vertical hub or post 19. Through the center of the hollow post 19 is a pitman or rod 21 of a crank of an eccentric drive 22 which is driven through a V-belt 23 by a motor 24 which is mounted on a base frame 20. At its upper end, the pitman 21 is connected through a pivot bearing 25 held elastically by rubber springs 26 with the carrier body 11. With this driving arrangement, the sieve cage is driven in rotation about its central axis and is simultaneously vertically rapidly oscillated about its axis with its axial accelerations of about 20 g.

In operation the driving rotary movement is obtained through the driving sleeve 13 driven by and secured to the V-belt pulley 14. This drive continues through adjusting elements 27 and through the radial pretension thrust springs 12 in the carrier body. At the top of the carrier body is a circular plate 28 which forms the bottom of a preacceleration chamber surrounded by a preacceleration cone 33. Also at the top of the carrier body 11 is an annular supporting ring 29 which is concentric with the sieve cage 10 and has a plurality of radially extending circumferentially spaced spokes 30 which extend between the ring 29 and the base of the sieve cage 10 and are spaced to permit the free flow of material downwardly past the spokes 30.

The material is initially supplied through an axially located downwardly extending feed pipe 31 into the preacceleration chamber. For the preacceleration chamber, the preacceleration cone 33 is mounted on the top of the circular plate 28 and flares upwardly so that its widest portion is at its top, and its top edge is essentially at the level of the top of the sieve cage 10. When the material flows downwardly into the preacceleration chamber, due to the centrifugal force of the rotating preacceleration cone 33, the material migrates upwardly along the wall of the cone 33 and is centrifuged over the upper rim of the cone onto the upper end of the cage 10. An annular collar 34 projects inwardly at the top of the sieve cage 10 and compels the material which flows out over the upper rim of the cone 33 to pass onto the porous cage 10. Sufficient space is provided between the collar 34 and the upper rim of the cone 33. The centrifugal material is thus distributed uniformly on the periphery of the sieve cage and will migrate downwardly on the inner surface of the sieve cage with the water passing through the porous wall of the cage onto the inner surface of an annular housing 35 which surrounds the sieve cage. At the base of the annular housing is a lateral water discharge passage 36. Mounted on the wall of the annular housing 35 are eyelets 41 for the connection of lifting hooks of a crane for handling.

As the solids become dewatered and flow downwardly on the inner surface of the sieve cage, they are collected by a solids collection housing ring 38 which extends downwardly and is mounted at the base of the sieve cage concentric therewith. The inner diameter of the housing ring 38 need only be slightly larger than the sieve cage thereby reducing the overall diameter of the unit which is necessary and effecting a reduction in the weight of the mechanism and the weight of the material collected from the sieve cage. The arrangement reduces the diameter necessary for the entire structural unit and reduces the entire structural height. When the dehydrated solids must again be brought to the center of the machine, such as to be alignment with chutes or cones positioned beneath the centrifuge which constitute an extension of the flow line 32, the radial space that the material must be brought inwardly is maintained at a minimum.

The collection housing is supported on the base frame 20 as illustrated generally in FIG. 2. The housing 20 is arranged to have a vertical space extending transversely of the centrifuge axis providing a space for positioning the V-belts 23 of the driving motor 24. This arrangement is easily accessible from the base or side of the frame 20 for rapid servicing and changing of belts. Between the housing 35 and the base frame is arranged a second horizontal channel or space 40 in which is located the horizontally extending V-belts 15 of the motor 16 for the rotary drive. This second space 40 is arranged so that it is easily and readily accessible for servicing and changing of belts. As illustrated, the housing 35 may be readily lifted upwardly by the eyelets 41 for access to the space 40.

In operation, the material descends downwardly through the feed pipe 31 as indicated by the arrowed line 32 and is deposited in the preacceleration chamber formed within the cone 33. The material flows upwardly out over the upper rim of the cone 33 and is distributed uniformly onto the inner surface of the sieve cage 10 and migrates down the inner wall of the sieve cage due to the oscillating drive of the unit. The water passes outwardly and is collected on the inner wall of the housing 35 to flow downwardly in the space within the housing 35 and outwardly of the solids collection ring 38 through a collection 36. Thus, the entire driven unit is compactly and strongly supported on the body 11 in a balanced arrangement wherein the forces are uniformly distributed above and below the top of the body 11. The collected solids are maintained at a minimum diameter for minimum stresses on the unit and for ease of conveyance toward the center of the unit to continue their flow through a system. Solids pass generally downwardly as indicated by the arrowed line 37 to be directed by suitable mechanism, not shown, and of course, protection is afforded the V-belts 15 so that the material does not enter onto the drive belts. The mechanism is compactly organized as made possible by the construction and arrangement of the parts, and the structure affords the advantages and objectives hereinabove set forth.

We claim as our invention:

1. A vertically oscillatible centrifuge for the dewatering of a fine grained material comprising in combination:

a vertical downwardly flaring frusto conically shaped sieve cage rotatable about its vertical axis and being axially oscillatible having a sieve portion with the diameter of the sieve portion increasing in a downward direction;

an oscillatory vertical drive;

first and second elastically yieldable connections between said drives and said sieve case so that the cage is simultaneously rotatable and vertically oscillatible;

a stationary housing surrounding said sieve cage for the collection of water passing through the sieve cage and forming a housing for the cage;

means for delivering a material to the interior of the sieve cage to be centrifuged;

and an annular downwardly extending stationary solids collection housing located at the lower end of the sieve cage and having an inner diameter at least as large as the maximum diameter of said sieve cage so that material passes downwardly along the inner wall of the sieve cage and is centrifuged over the lower edge to the solids collection housing so that the solids are at a relatively low elevation and a relatively small circumference when they reach the solids collection housing.

2. A vertically oscillatible centrifuge for the dewatering of a fine grained material constructed in accordance with claim 1:

including mounting means secured between said drives and said sieve cage at the largest diameter of said sieve cage.

3. A vertically oscillatible centrifuge for the dewatering of a fine grained material constructed in accordance with claim 2:

wherein said mounting means includes an annularly shaped shell and a plurality of circumferentially spaced radially extending spokes between the shell and the sieve cage.

4. A vertically oscillatible centrifuge for the dewatering of a fine grained material constructed in accordance with claim 1:

including a frusto conical shaped preacceleration cone coaxially supported within the sieve cage and being of smaller diameter with said delivering means feeding material into said preacceleration cone and said cone being larger at its upper end.

5. A vertically oscillatible centrifuge for the dewatering of a fine grained material constructed in accordance with claim 4:

wherein the upper end of said preacceleration cone is substantially at the height of the upper end of the sieve cage.

6. A vertically oscillatible centrifuge for the dewatering of a fine grained material constructed in accordance with claim 4:

including an annular horizontally extending collar mounted at the upper end of the sieve cage extending over the space between the top of the sieve cage and the top of the preacceleration cone.

7. A vertically oscillatible centrifuge for the dewatering of a fine grained material constructed in accordance with claim 1:

wherein said stationary housing is mounted on a base frame having a space defined therein extending vertically and radially of the centrifugal axis of the sieve cage with said oscillatory drive positioned in said space.

8. A vertically oscillatible centrifuge for the dewatering of a fine grained material constructed in accordance with claim 7:

wherein said base frame has a second space extending radially of the axis of the sieve cage with said rotary drive positioned in said second space.

9. A vertically oscillatible centrifuge for the dewatering of a fine grained material comprising in combination:

a preacceleration frusto conically shaped shell rotatable about its vertical axis and axially oscillatible with the widest portion facing upwardly;

a material delivering means extending downwardly axially into said preacceleration shell;

rotary and oscillatory drive means connected to said shell;

a porous sieve cage coaxial with said shell and surrounding the shell with material passing over the upper edge of the shell being distributed onto the inner surface of said cage;

rigid drive means extending between the shell and sieve cage for simultaneous driving thereof;

an annular housing surrounding the sieve cage for the collection of water passing therethrough;

and material collection means positioned at the base of the sieve cage for the collection of materials passing down the inner walls of the sieve cage.

* * * * *